United States Patent [19]

Ikegaya et al.

[11] Patent Number: 5,263,129
[45] Date of Patent: Nov. 16, 1993

[54] MANUAL SHEET PRODUCTION AND UTILIZATION APPARATUS

[75] Inventors: Tadahiko Ikegaya; Susumu Yamamoto; Nobuyuki Shigeeda; Masahiko Katsurabayashi, all of Saitama, Japan

[73] Assignee: Fuji Xerox Co., Ltd., Tokyo, Japan

[21] Appl. No.: 587,100

[22] Filed: Sep. 24, 1990

[30] Foreign Application Priority Data

Jan. 24, 1990 [JP] Japan ................................. 2-12425

[51] Int. Cl.$^5$ .......................................... G06F 15/411
[52] U.S. Cl. ..................................... 395/118; 395/164
[58] Field of Search ............... 395/145, 148; 358/401, 358/448, 468, 470, 462, 453; 355/40, 233, 244

[56] References Cited

U.S. PATENT DOCUMENTS

| | | | |
|---|---|---|---|
| 4,322,157 | 3/1982 | Miura et al. | 355/14 C |
| 4,417,322 | 11/1983 | Berry et al. | 364/900 |
| 4,494,862 | 1/1985 | Tanaka | 355/14 |
| 4,924,324 | 5/1990 | Takaoka | 358/468 |
| 5,012,353 | 4/1991 | Yoshino et al. | 358/401 |
| 5,040,078 | 8/1991 | Yahora | 358/448 |
| 5,075,787 | 12/1991 | Shaughnessy et al. | 358/452 |

FOREIGN PATENT DOCUMENTS

| | | |
|---|---|---|
| 0103317A2 | 3/1984 | European Pat. Off. . |
| 0114723 | 8/1984 | European Pat. Off. . |
| 0159400B1 | 10/1985 | European Pat. Off. . |
| 3347644A1 | 11/1984 | Fed. Rep. of Germany . |
| 3809683A1 | 10/1989 | Fed. Rep. of Germany . |
| 1-261767 | 10/1989 | Japan . |
| 2170335 | 7/1986 | United Kingdom . |
| 2202064A | of 1988 | United Kingdom . |
| 2220511A | 1/1990 | United Kingdom . |

*Primary Examiner*—Heather R. Herndon
*Assistant Examiner*—Joseph H. Field
*Attorney, Agent, or Firm*—Finnegan, Henderson, Farabow, Garrett & Dunner

[57] ABSTRACT

An apparatus for producing and utilizing sheets of manuals containing data corresponding to operating procedures for electronic devices. Data related to an electronic device is input into the production portion and stored in the apparatus. Relevant area data and character code strings are converted to frame and image data, which is combined and printed onto a manual sheet. The printed data, which corresponds to the desired operating procedure, can then be read into the utilization portion of the device. The data is matched with corresponding function data, which is read out to operate the electronic device in accordance with the operating procedures.

3 Claims, 10 Drawing Sheets

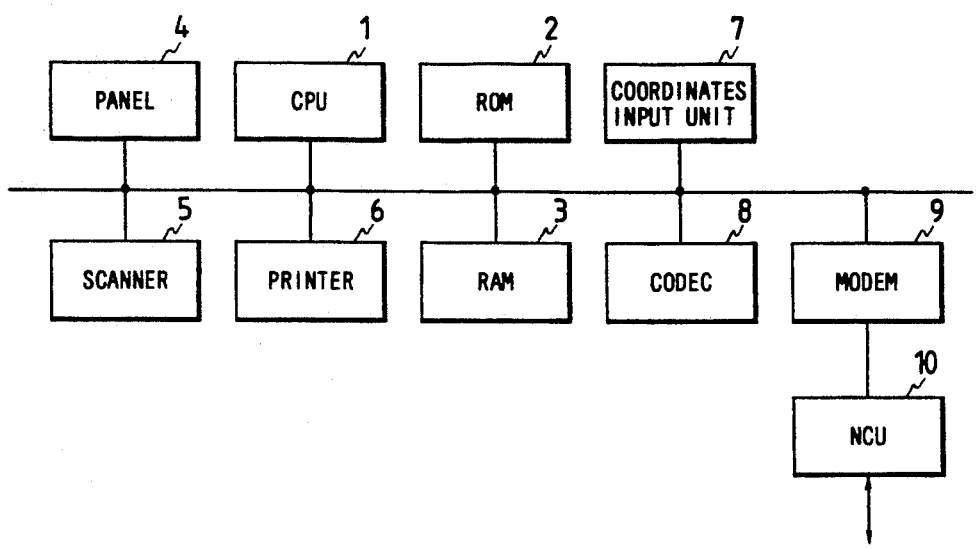
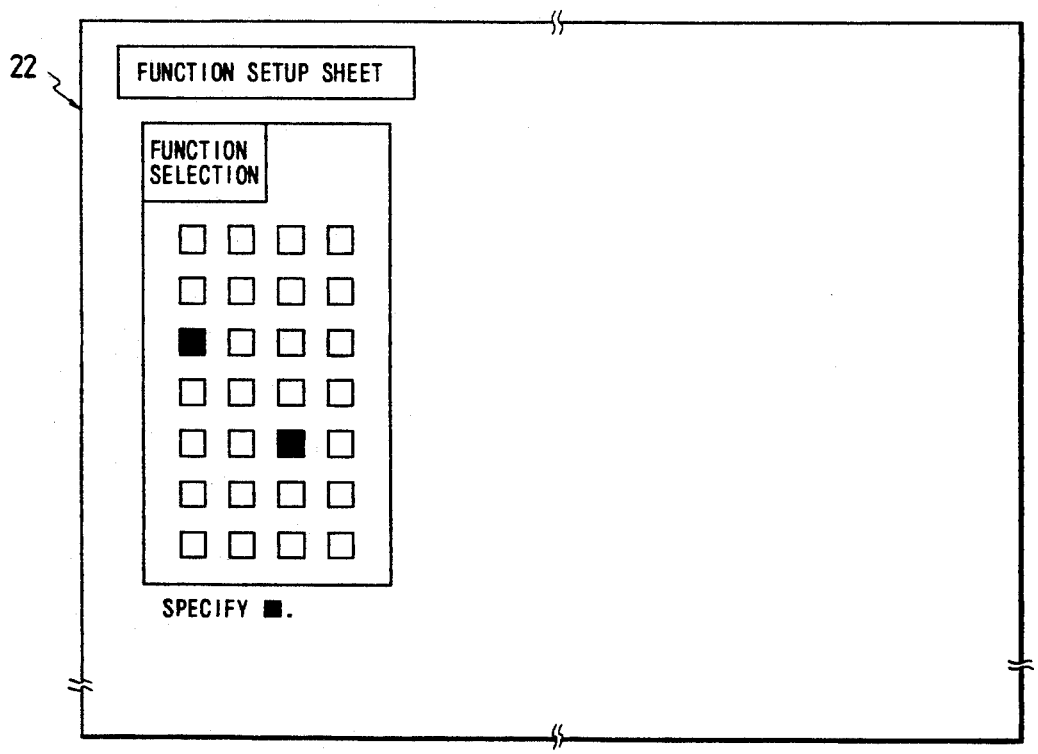

(TABLE B1)

| 1st POINT COORDINATES | 2nd POINT COORDINATES | FUNCTION NO. |
|---|---|---|
| (x1, y1) | (x2, y2) | |
| (x1, y1) | (x3, y3) | F(1) |
| (x4, y4) | (x8, y8) | F(2) |
| (x7, y7) | (x12, y12) | F(3) |
| (x11, y11) | (x16, y16) | F(4) |
| ⋮ | ⋮ | ⋮ |
| (x19, y19) | (x20, y20) | F(12) |
| (x21, y21) | (x22, y22) | F(13) |
| (x23, y23) | (x24, y24) | F(14) |
| (x25, y25) | (x2, y2) | |

(TABLE C)

| FUNCTION NO. | CHARACTER CODE |
|---|---|
| F(1) | "ABBREVIATED NO." |
| F(2) | "1" |
| F(3) | "2" |
| F(4) | "3" |
| F(5) | "4" |
| ⋮ | ⋮ |
| F(12) | "CLEAR" |
| F(13) | "SET" |
| F(14) | "3-FIGURE ABBREVIATED NO. SPECIFICATION" |

| POINT | COORDINATES |
|---|---|
| P1 | (x1, y1) |
| P2 | (x2, y2) |
| P3 | (x3, y3) |
| ⋮ | ⋮ |
| P23 | (x23, y23) |
| P24 | (x24, y24) |
| P25 | (x25, y25) |

FIG. 10

| REGISTRA-TION NO. | TELEPHONE NO. (NUMBER IN FULL) | COMMUNICATION MODE | ADDRESS |
|---|---|---|---|
| 1 2 3 | 0 4 8 7 9 8 5 1 1 1 | AUTOMATIC | FX IWATSUKI |
| 2 3 4 | 0 4 6 2 3 8 3 1 1 1 | AUTOMATIC | FX EBINA |
| ⋮ | ⋮ | ⋮ | ⋮ |

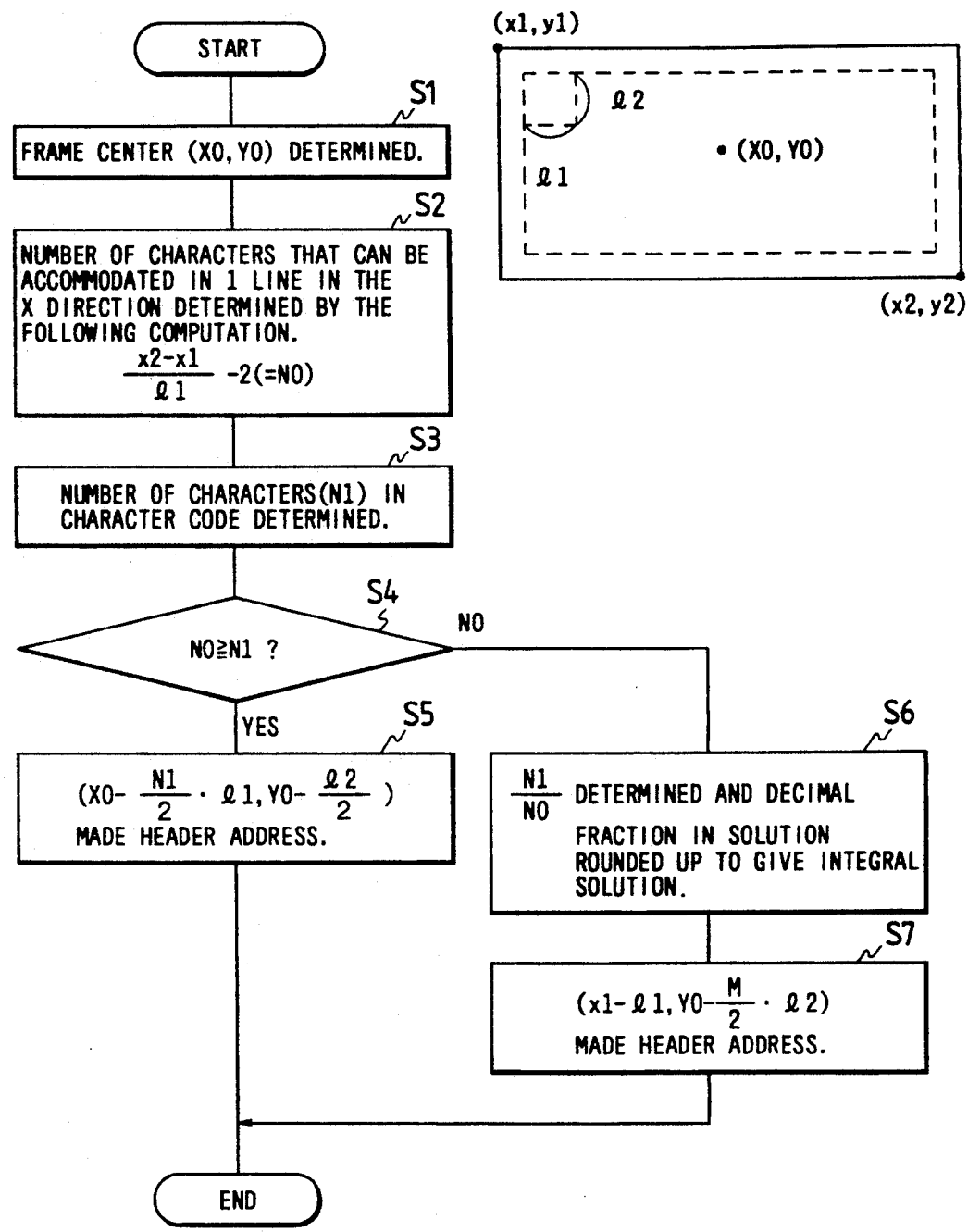

MANUAL SHEET PRODUCTION AND UTILIZATION APPARATUS

BACKGROUND OF THE INVENTION

1. Field of the Invention

The present invention relates to an apparatus for the production and use of sheets of manuals. More particularly the invention relates to a manual sheet production and utilization apparatus which supplies sheets of manuals describing user-friendly operating procedures and permits users to execute operations easily by using these sheets.

2. Discussion of the Related Art

The procedure employed in the past for registration and setup of various functions in a facsimile machine has been to open a manual (an instruction booklet) to find out how to effect the registration or setup, and actuate control panel keys following the procedure described in the manual.

For example to register a quick-dial number, the user puts the machine into "quick-dial number registration" mode by means of a function key and digit keys, uses the digit keys to enter an abbreviated number, presses a "Set" key, enters the full telephone number of the party concerned, and then inputs this party's name in code.

A similar procedure is followed for registration of data such as broadcast group registration, and relay group registration data, etc., and for setup data such as broadcast group message reception/results tables, and relay group message reception/results tables, etc.

In cases where it is required to execute a particular function using a facsimile machine, the conventional procedure is to open a manual at the relevant page and follow the operating procedure described therein. For a transmission, for example, to decide whether to input the information of the original document into memory and then dial the number of the intended recipient, or to dial a number to call the other party and then effect transmission while the original document is read, the user normally refers to the manual and makes the selection by performing operations that are described in the manual. Operations for things such as calling reception and print-out of lists in memories are usually performed by referring to a manual.

The prior art has the drawback that operations are troublesome since registration or setup of the above-noted functions necessitates alternately looking at a manual and an operating panel. It is necessary to alternately move the user's line of vision back and forth from the manual to the operating panel.

Further, with some manuals, the description of operating procedures is difficult to understand and this constitutes a hindrance when using a facsimile machine.

SUMMARY OF THE INVENTION

The present invention has been made in view of the above circumstances and has as an object to resolve the problems associated with conventional devices.

A further object of the present invention is to provide a manual sheet production device and utilization apparatus which makes registration, setup, and execution of various functions such as those noted above easy, and which thereby makes use of a facsimile machine a simple operation.

To achieve the objects and in accordance with the purpose of the invention, as embodied and broadly described herein, the manual sheet production and utilization apparatus comprises input means for inputting a plurality of electronic device information, including at least area data and corresponding character code strings; first memory means for storing the area data and corresponding character code strings; access means for accessing the first memory means and reading out the area data and corresponding character code strings; first converting means for converting the area data into frame data; second converting means for converting the corresponding character code strings into image data; second memory means for combining and storing the frame data and image data as operating procedure data for the electronic device; and printing means for printing the operating procedure data on the manual sheet.

The invention further includes reading means for reading the operating procedure data on the manual sheet; third memory means for storing area data and function data corresponding to the operating procedure data; second access means for accessing the third memory means and reading out the corresponding function data; and executing means for executing the function data to operate the electronic device.

BRIEF DESCRIPTION OF THE DRAWINGS

The accompanying drawings, which are incorporated in and constitute a part of the specification, illustrate embodiments of the invention and, together with the description, serve to explain the objects, advantages and principles of the invention.

FIG. 2 is a block diagram showing the hardware configuration of the invention;

FIG. 6 is a drawing showing one example of a manual sheet that is used in a print-out;

FIG. 10 is a conceptual representation of one specific example of registration tables produced by this manual sheet utilization apparatus; and FIG. 11 is a flowchart for the purpose of describing one example of operation of a write-in address generation means.

DETAILED DESCRIPTION OF THE PREFERRED EMBODIMENTS

Figure 1:
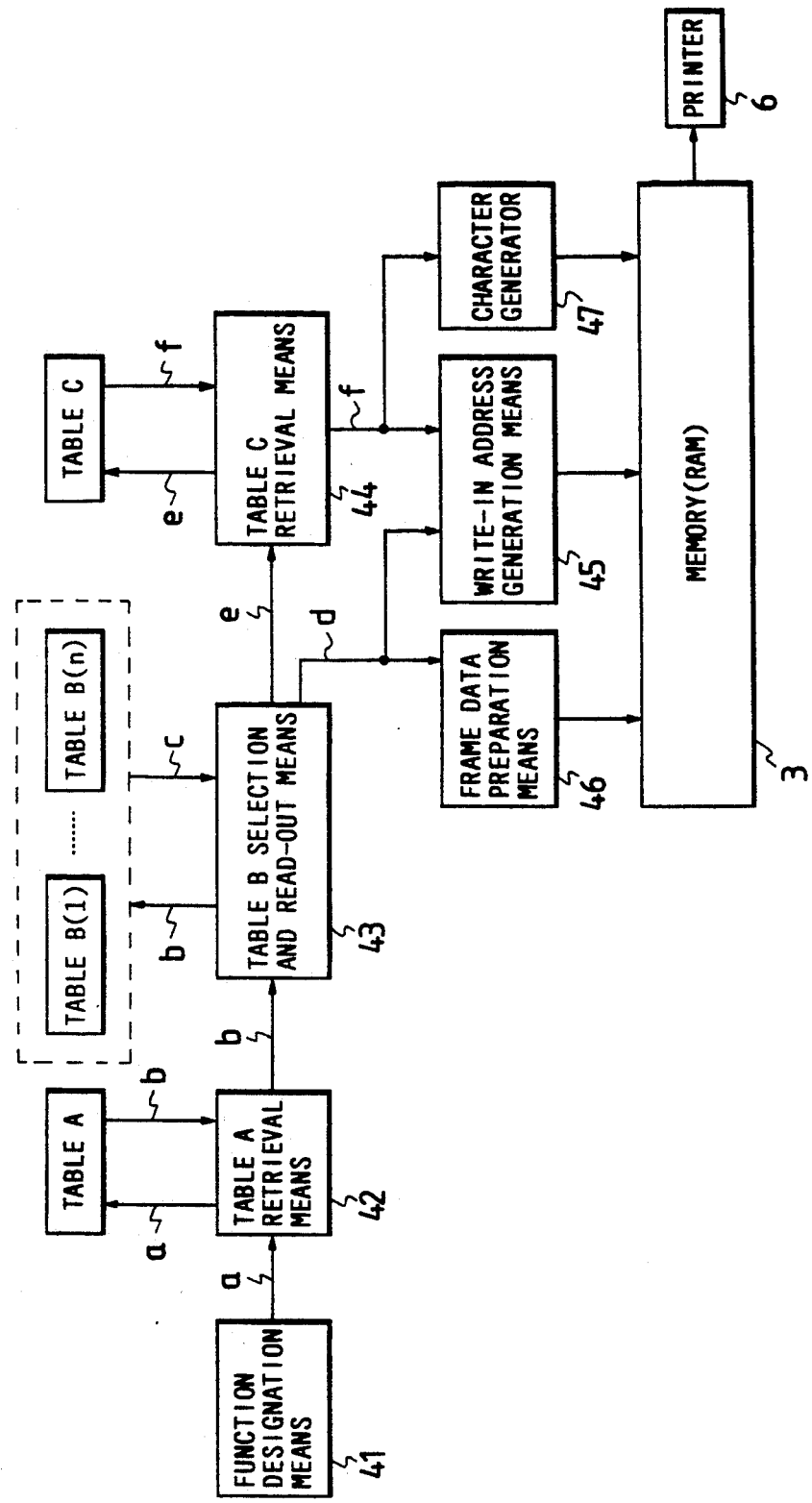
FIG. 1 is a block diagram of a manual sheet production apparatus according to one embodiment of the invention.

A detailed description of the invention will now be given with reference to the drawings.

It is an aspect of the invention that in order to accomplish the objects the invention comprises an input means for input of manual sheet selection and print-out commands, a first memory means which stores at least area data of sheets of manuals and character code strings that are entered therein, a means for accessing the first memory means on the basis of manual serial numbers and reading out the above-noted area data and corresponding character code strings, a means which uses the area data to produce frame information, a means for converting character code strings into image data, a second memory means for storing manual sheet information produced by combining the frame information and character code string image data and a means for printing out the manual sheet information that is stored in the second memory means.

According to this invention, on input of manual sheet selection signals via the input means, area data for a sheet of a manual and character code string noted therein are read out from the first memory means, the area data is converted to frame information, while the character code string is converted to image data, and the results are sent to the second memory means. Next, the manual sheet information stored in the second memory means is printed out as a hard copy.

In this manner, it is possible to produce a sheet of a manual that is matched to the coordinates input unit.

It is also an aspect of the invention that it comprises a coordinates input unit which outputs coordinates data specified from a sheet of a manual that is placed on it, a memory means which stores at least area data and function data in correspondence thereto, a read-out means which accesses the memory means on the basis of the coordinates data and reads out the corresponding function data and a means which registers or executes the function data that has been read out.

According to this invention, a requisite input operation is performed when a sheet of a manual is placed on the coordinates input unit and the operator indicates one point in a set area of this sheet of the manual. The coordinates data of this one point constitutes key data for reading out function data from the memory means and the function data read out is registered by a registration means. Also, the function data can be immediately executed by an execution means As a result, the operator can easily register, set up and execute a variety of functions.

FIG. 2 broadly shows the hardware configuration of a facsimile machine with a memory function Reference numeral 1 represents a CPU which controls overall operations in accordance with programs. Reference numeral 2 represents a ROM which holds these programs and also holds the manual data which is a special feature of the invention. Reference numeral 3 represents a RAM which serves to store data and to make work areas available. Reference numeral 4 represents a panel section in which digit keys, various operation keys and a display section, etc are provided. Reference numeral 5 represents a scanner for reading original document information. Reference numeral 6 represents an output section which prints out received image information and manual data, etc. that is stored in ROM 2. Reference numeral 7 represents a coordinates input unit for inputting the coordinates of points that are designated by means of a light pen, etc. Reference numeral 8 represents a coding/decoding unit (CODEC). Reference numeral 9 represents a modulator-demodulator (modem). Reference numeral 11 represents a circuit control unit (NCU).

An example of the coordinates input unit 7 and its peripheral circuits will now be described with reference to FIG. 3.

Figure 3:
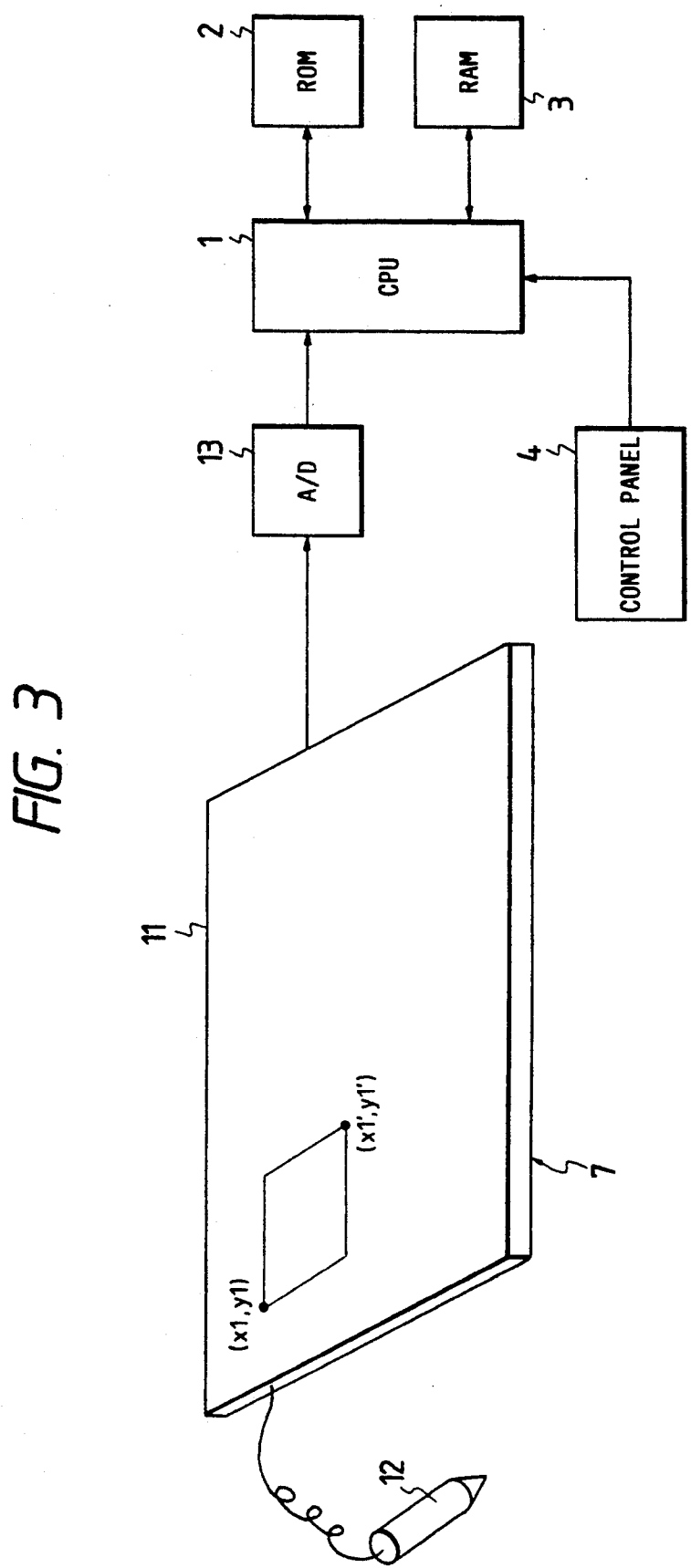
FIG. 3 is a block diagram of a coordinates input unit and elements peripheral thereto.

Reference numeral 11 in FIG. 3 represents a coordinates input screen and reference numeral 12 depicts a light pen. These elements comprise the coordinates input unit 7. Reference numeral 13 represents an A/D converter which converts analog signals to digital signals. The other numbers indicate elements that are the same as or equivalent to the like-numbered elements of FIG. 2.

When one point on the coordinates input screen 11 is designated by the light pen 12, coordinates information is input as analog values to the A/D converter 13 and converted to digital values. Having been converted to digital values, the coordinates information is supplied to the CPU 1 which records it in the RAM 3 and retrieves a table in correspondence to this information in the RAM 3. Designation of two points (x1, y1) and (x1', y2') on the coordinates input screen 11 by the light pen 12 as indicated in the drawing results in input of the area defined by these points.

A description of the details of the structure and operation of the coordinates input unit 7 will be omitted here since these details are disclosed in Japanese Laid-open Patent Application H1-261767 submitted by the present applicant, incorporated herein by reference.

Next, an example of the configuration of manual data which has been loaded in readiness into the ROM 2 by the manufacturer will be described with reference to FIG. 4.

Figure 4:
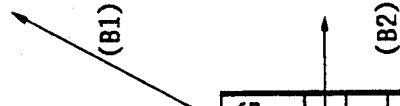
FIG. 4 is a conceptual representation and FIGS. 5(a), 5(b), and 5(c) are drawings showing specific examples of manual sheet data tables that are stored in the ROM or RAM of FIG. 2.
Figures 5A, 5B, 5C:
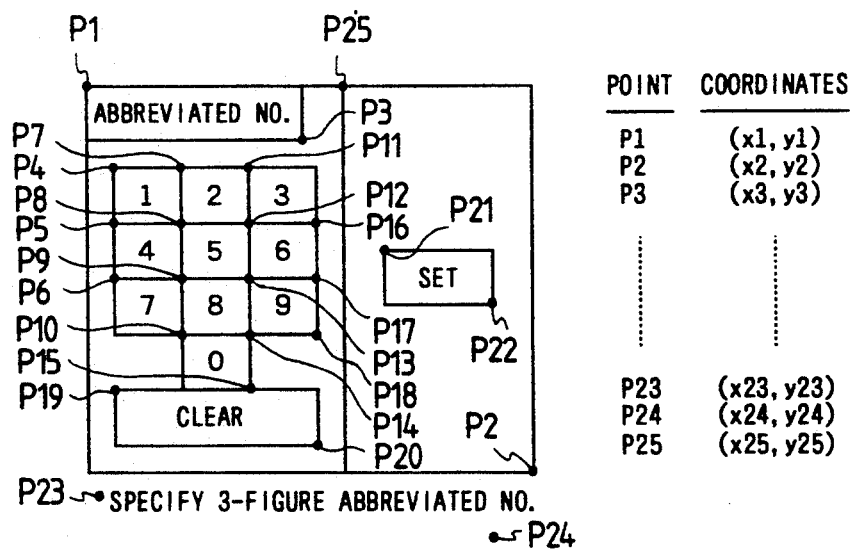

As shown in FIG. 4, the manual data consists of three types of tables A, B and C. Table A is a table which contains the serial numbers of manuals and provides correspondence with tables B. Tables B are tables which give the correspondence between the serial numbers of functions and the coordinates of the 1st and 2nd points, i.e., the areas determined by these coordinates Table C is a table which gives correspondence between function serial numbers and character code strings FIG. 5 (a) shows a specific example of a table B1 constituting one of the above-noted tables B. FIG. 5 (b) shows a specific example of table C. Reading and print-out of these tables by means of a manual sheet production unit that is described below can give an image which is as shown in FIG. 5 (c) (but does not contain the indications P1–P25). It is given that the coordinates of the points P1–P25 in this figure are respectively (x1, y1)–(x25, y25).

Next, one embodiment of the manual sheet production unit of the invention will be described. FIG. 1 is functional block diagram of this embodiment Reference numeral 41 represents a function specification means which, e.g., corresponds to set keys on the control panel 4, or to an arrangement in which a function setup sheet 22 as shown in FIG. 6 is set on the coordinates input unit 7 (see FIGS. 2 and 3). Reference numeral 42 represents a table A retrieval means, reference numeral 43 represents a table B selection and read-out means, reference numeral 44 represents a table C retrieval means and 45 is a write-in address generation means. The functions of these various means are performed by the CPU 1. Reference numeral 46 represents a frame data preparation means, reference numeral 47 represents a character generator which converts character codes to image data, and the other numbers indicate elements that are the same as or equivalent to the like-numbered elements of FIG. 2.

Tables A, B(1)–(n) and C are stored in the ROM 2 or in a RAM that is backed up by a battery, or the like.

If the blacked-out domains representing "print-out" and a quick-dialing sheet in the function selection field of the function setup sheet of FIG. 6 are designated by, e.g., a light pen, or if print-out of a quick-dialing sheet is specified by means of keys on the control panel 4, the function specification means 41 of FIG. 1 inputs a manual serial number "a" to the table A retrieval means 42. Retrieval means 42 uses the number "a" to retrieve table A and determine a table B serial "b". This number "b" is supplied to the table B selection and read-out means 43, which selects a table from among tables B(1)-B(n) and reads out data "c" from the selected table. Data "c" consists of the coordinates data of the 1st and 2nd points and a function serial number.

The 1st and 2nd point coordinates data "d" read out from the table B is supplied to the write-in address generation means 45 and to the frame data preparation means 46, and the function serial number data "e" is supplied to the table C retrieval means 44, which refers to this data "e" to read out from table C a character code string "f" that corresponds to the data "e". The character code string "f" is supplied to the write-in address generation means 45 and to the character generator 47.

The write-in address generation means 45 uses the 1st and 2nd point coordinates data "d" to produce frame data write-in addresses and also refers to the 1st and 2nd point coordinates data and to the amount of data in the character code string "f" to produce write-in addresses such that the character codes are located with good balance in the central portion of the area defined by the 1st and 2nd point coordinates "d".

The frame data preparation means 46 produces frame data on the basis of the 1st and 2nd point coordinates data. Operation of the frame data preparation means 46 can be inhibited by signals not shown in the drawing. In other words, it is possible to choose to have frame data produced or not to have it produced.

The character generator 47 converts the character code string "f" to image data and supplies this to the memory 3.

As a result, the frame data and the character code string image data are now stored in set addresses in the memory 3.

When all the data has been stored in this manner in the memory 3, it is supplied to the printer 6 and printed out.

Figure 7:
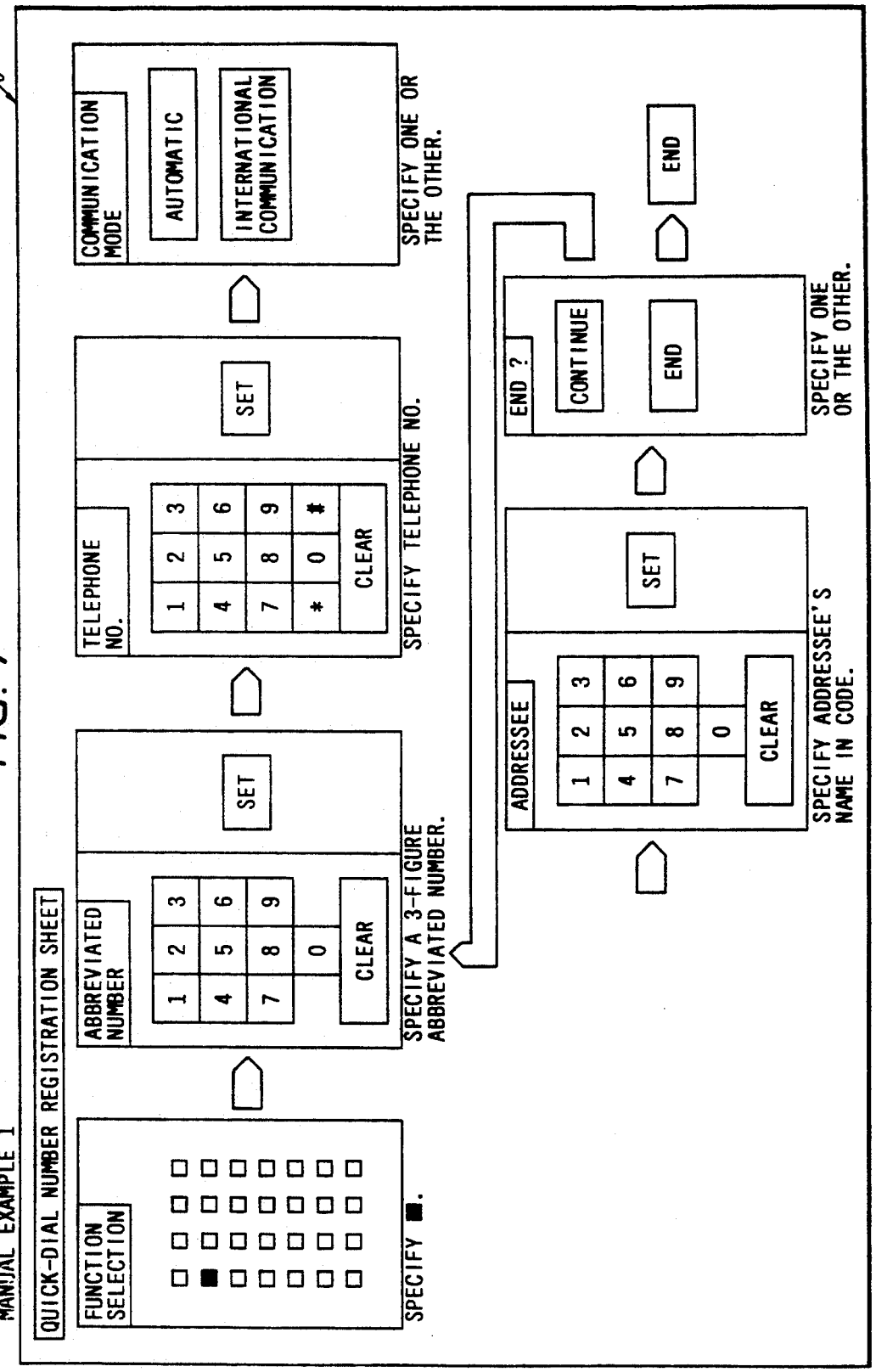
FIG. 7 displays one example of a manual sheet that has been printed out.

An example of a sheet of a manual that is printed out in this manner is shown in FIG. 7, which is an example of quick-dial number registration sheet.

This sheet consists of a function selection field, an abbreviated number field, a telephone number field, a communication mode field, an address field and an end decision field. The function selection field is provided with an array of function selection keys. The abbreviated number field is provided with digit keys, a clear key, and a set key The telephone number field is provided with digit keys, a clear key, a * key, a # key, and a set key. The communication mode field is provided with an automatic key and an international communication key The address field is provided with digit keys, a clear key and a set key The end decision field is provided with a "continue" key and an "end" key.

FIG. 5 shows the form of the corresponding data registration in the ROM 2 and the results of print-out when the abbreviated number field has been selected from the abbreviated number field, telephone number field, communication mode field, address field, and end decision field of FIG. 7.

Figure 8:
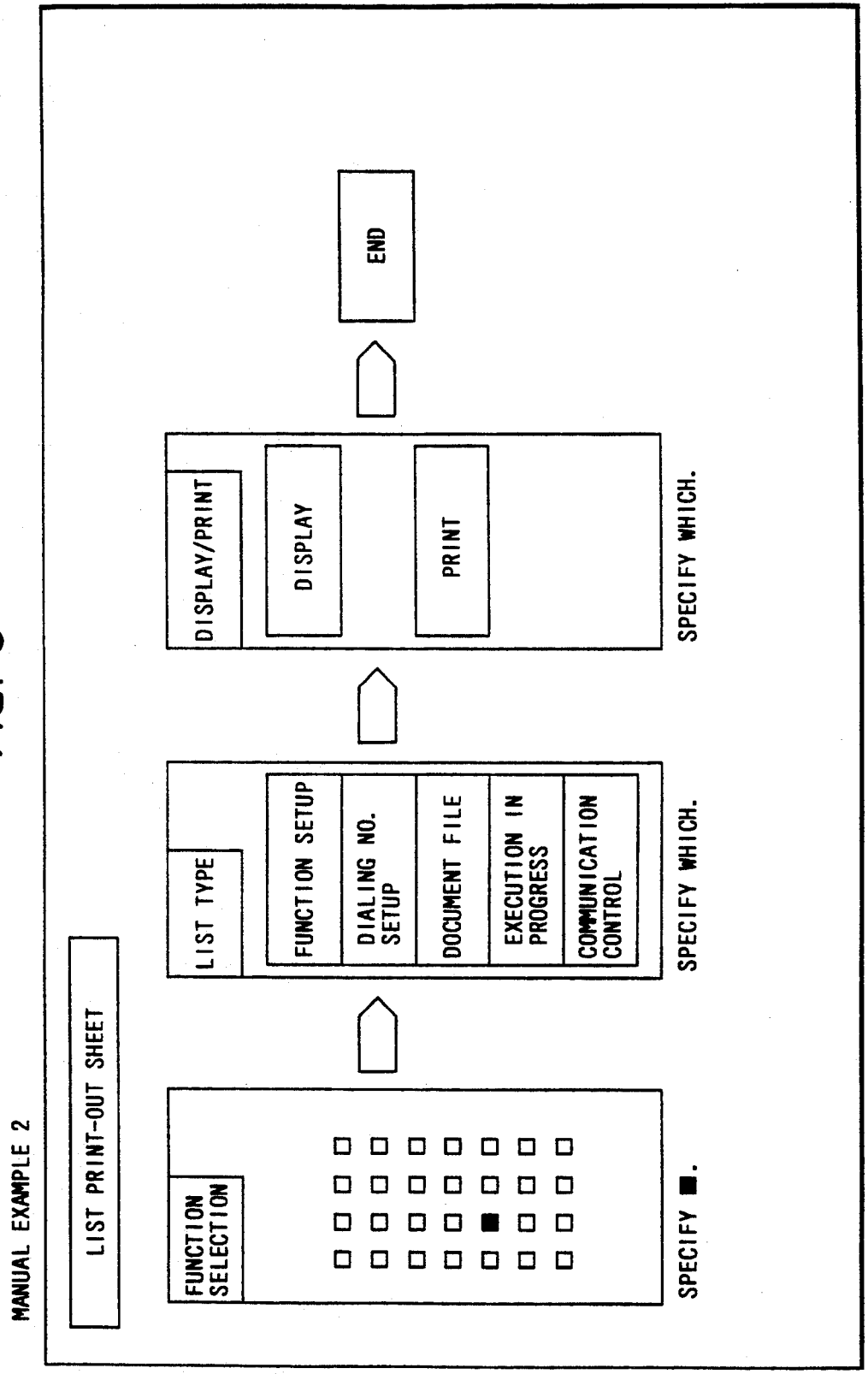
FIG. 8 displays another example of a manual sheet.

Another example of a manual sheet printed out by the manual sheet production unit is shown in FIG. 8. This manual sheet is a useful sheet for print-out of lists.

Next, the configuration and operation of a unit for the registration and setup of functions using a sheet of a manual that has been produced in the manner described above, i.e , a manual sheet utilization unit, will be described with reference to FIG. 9, which is a functional block diagram of one embodiment of the manual sheet utilization unit.

Figure 9:
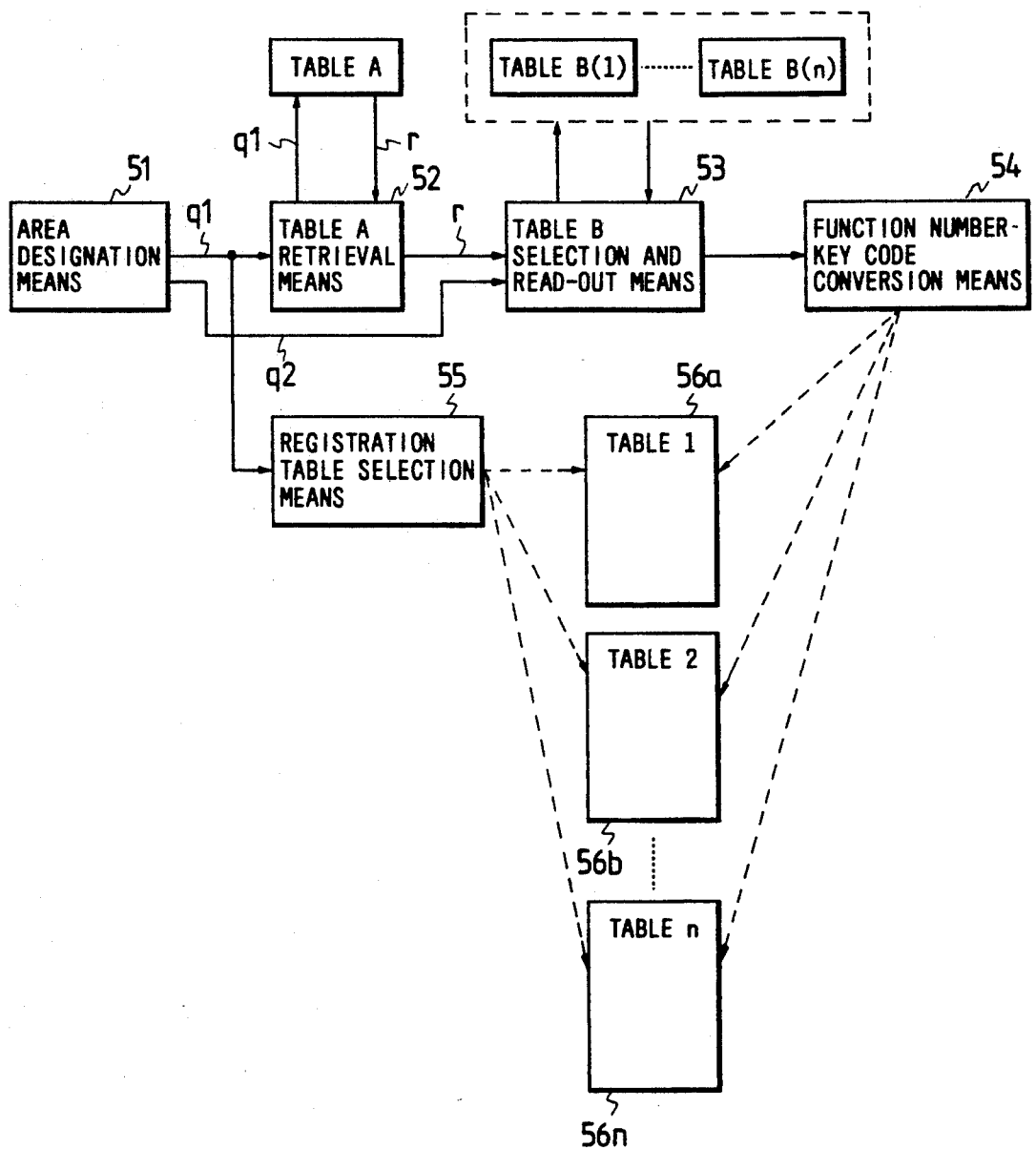
FIG. 9 is a functional block diagram of a manual sheet utilization apparatus according to one embodiment of the invention.

In FIG. 9, reference numeral 51 represents an area designation means and corresponds to a sheet of a manual that is placed on the above-described coordinates input screen 11 (see FIG. 3). Reference numeral 52 represents a table A retrieval means, reference numeral 53 represents a table B selection and read-out means, reference numeral 54 represents a function number—key code conversion means and reference numeral 55 represents a registration table selection means. The functions of these various means are performed by the CPU 1. The registration tables 56a-56n are allocated set areas in a RAM with a backup.

There now follows a specific description of operation of the manual sheet utilization unit using the "quick-dial number registration sheet" of FIG. 7. When the quick-dial number registration sheet is placed on the coordinates input screen 11 and the light pen 12 is used to designate one point constituted by the domain blocked in black in the function selection field, the values of the coordinates of this point are supplied as manual signals q1 to the table A retrieval means 52, which thereupon retrieves table A and calls out a quick-dial number registration table B (e.g., B(1)). A table B1 selection signal "r" is supplied to the table B selection and read-out means 53, which thereupon accesses table B1.

Also, the registration table selection means selects an empty registration table, e.g., table 56b.

When digit domains in the abbreviated number field of the "quick-dial number registration sheet" are successively designated by means of the light pen 12, the values q2 of the coordinates of each of these domains are supplied to the table B selection and read-out means 53, which refers to these coordinate values, retrieves table B(1) and reads out the corresponding function number. If now the "Set" domain is designated, the function number that has been read out is converted to a key code by the function number—key code conversion means 54 and this key code is registered in table 56b.

Next, when digit domains in the telephone number field of the "quick-dial number registration sheet" are successively designated by means of the light pen 12, the values q2 of the coordinates of each of these domains are supplied to the table B selection and read-out means 53 and serve to bring about retrieval of table B(1). The table B selection and read-out means 53 refers to these coordinate values, retrieves table B(1) and reads out the corresponding function number. If now the "Set" domain is designated, the function number that has been read out is converted to a key code by the function number—key code conversion means 54 and this key code is registered in table 56b.

When set domains of the communication mode field and the address field of the "quick-dial number registration sheet" are designated in the same way by the light pen 12, the values of the coordinates of these various domains serve as the basis for retrieval of table B(1), conversion to key codes by the function number—key code conversion means 54, and registration of these key codes in table 56b.

The above operation completes registration of an abbreviated number.

If it is now wished to register another abbreviated number, "Continue" in the end decision section is designated and an operation as described above is repeated. If, on the other hand, it is not wished to register another abbreviated number, registration operations are terminated by designating "End" in the end decision section.

A conceptual representation of the registration table 56b in which quick-dial numbers have been registered in the above-described manner is shown in FIG. 10.

If the manual sheet of FIG. 8, i.e., a list print-out sheet is placed on the coordinates input screen 11, and then first one spot in a specific area in the function selection field is selected, and then this is followed by designation of a particular item in the list types field and designation of "Print" in the display/print field, the data of the list designated in the list type field can be printed out as a hard copy.

Thus, with this embodiment it is not necessary to perform operations with a manual (instruction booklet) open, as has been done in the past, but all that is needed is to place a sheet of a manual on the coordinates input screen and specify particular areas by means of a light pen, etc. It is therefore extremely easy to register or set up various functions and to effect performance of facsimile machine functions, and the like.

A specific description will now be given of the execution of the functions of the write-in address generation means 45 of FIG. 1.

FIG. 11 is a flowchart for the purpose of describing this function.

It is supposed that the coordinates (x1, y1) of a 1st point and the coordinates (x2, y2) of a 2nd point have been given to the write-in address generation means 45 by the table B selection and read-out means 43 and that the size of 1 character is 11 in the x direction and 12 in the y direction.

First, the center (XO, YO) of the frame prescribed by the 1st and 2nd point coordinates is determined (step S1).

Next, the number of characters that can be accommodated in one line in the x direction is determined from (x2−x1)/11−2 (step S2). The answer to this is designated as NO. 2 is subtracted so as to make the characters that are written inside the frame be separated by 1 character from the frame.

Next, the number N1 of characters is determined from the character code string that is supplied from the table C retrieval means 44 (step S3). Then, it is determined whether or not NO≧N1 (step S4). In other words, it is determined whether or not the number N1 of character code string characters is a quantity such as can be accommodated in one line of the frame. If the answer in step S4 is "Yes", the process goes to step S5 and (XO−N1/2.11, YO−12/2) is made the write-in header address.

If the answer in step S4 is "No", there is an advance to step S6 and a calculation is performed to determine how many x-direction frame lines the number of characters determined from the character code string corresponds to. In more detail, N1/N2 is determined and any decimal fraction portion of the result obtained is rounded up to give an integral solution M. This calculation gives the information that the number of characters of the character code string will take up M lines.

Next, there is an advance to step S7 and (x1-11, YOM/2.12) is made the write-in header address.

The above operation results in the lines of characters produced by the character code string being printed with good balance in the center of the frame.

It will be apparent that the write-in address generation means 45 can be eliminated from FIG. 1 if header address data is added to table C.

As is clear from the above description, according to the invention a required sheet of a manual is output by a printer and a user can cause performance of required functions, i.e., registration or setup of various functions and execution of facsimile machine functions, etc. by placing this sheet of the manual on a coordinates input screen and performing operations in accordance with the instructions written on the sheet. Consequently, there is no need to actuate keys on an operating panel while having a manual (instruction booklet) open as has been done in the past and the registration or setup of various functions and the execution of functions can be effected by operators very easily and in a short time.

The foregoing description of preferred embodiments of the invention has been presented for purposes of illustration and description. It is not intended to be exhaustive or to limit the invention to the precise form disclosed, and modifications and variations are possible in light of the above teachings, or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims attached hereto, and their equivalents.

What is claimed is:

1. An apparatus for producing and using sheets of manuals containing operating procedure data for electronic machines having an associated printing device, said apparatus comprising:

first memory means for storing data corresponding to an operating procedure manual and including portion data and corresponding character code strings, said portion data representing a portion of the manual;

input means for inputting coordinates to select the portion data;

access means for accessing said first memory means and reading out the portion data and the corresponding character code strings from said first memory means in accordance with coordinates supplied by said input means;

first converting means for converting the portion data read out by said access means into frame data;

second converting means for converting character code strings corresponding to the portion data read out by said access means into image data;

second memory means for combining and storing said frame data and said image data as operating procedure data;

means for operating the associated printing device to print out the operating procedure data on a printed manual sheet; and means associated with said input means for inputting data from the printed manual sheet.

2. The apparatus of claim 1, further including means for determining write-in header addresses for said corresponding character code strings and centering said image data as operating procedure data on the printed manual sheet.

3. The apparatus of claim 1, wherein said means associated with said input means includes means for reading the operating procedure data on the printed manual sheet, and further comprising:

third memory means for storing portion data and function data corresponding to the operating procedure data;

second access means for accessing said third memory means and reading out function data stored therein; and executing means for executing procedures corresponding to said function data to operate the electronic machine.

* * * * *